United States Patent
Letellier

[11] Patent Number: 6,154,530
[45] Date of Patent: Nov. 28, 2000

[54] TELECOMMUNICATION EQUIPMENT, SYSTEM AND METHOD COMPRISING MANAGEMENT MEANS FOR MANAGING SUBSCRIBER CALL-BACK LISTS

[75] Inventor: Sabine Letellier, Le Mans, France

[73] Assignee: U.S. Philips Corporation, New York, N.Y.

[21] Appl. No.: 09/047,601

[22] Filed: Mar. 25, 1998

[30] Foreign Application Priority Data

Apr. 22, 1997 [FR] France ................................ 97 04941

[51] Int. Cl.⁷ ...................................... H04M 1/56
[52] U.S. Cl. ...................... 379/142; 379/209; 455/415
[58] Field of Search .................................. 379/209, 142, 379/216; 455/4.5, 414

[56] References Cited

U.S. PATENT DOCUMENTS 5,303,301  4/1994  Takahata ............................ 379/209 X
6,009,155  12/1999  Adachi ............................... 379/209 X

FOREIGN PATENT DOCUMENTS 540928     5/1993   European Pat. Off. ............... 379/209
0746130A1  12/1996  European Pat. Off. ....... H04M 1/274

*Primary Examiner*—Creighton Smith
*Attorney, Agent, or Firm*—Dicran Halajian

[57] ABSTRACT

The invention provides means for storing in a call-back memory of a terminal unit termed called unit subscribed to a telecommunications network, subscriber numbers called calling units desiring to be called back after an unsuccessful attempt at calling the terminal unit. The invention notably provides means for managing one or various call-back lists, offering the calling subscribers the possibility of giving a call-back priority index to their subscriber number notably as a function of the urgency of their call.

10 Claims, 3 Drawing Sheets

TELECOMMUNICATION EQUIPMENT, SYSTEM AND METHOD COMPRISING MANAGEMENT MEANS FOR MANAGING SUBSCRIBER CALL-BACK LISTS

FIELD OF THE INVENTION

The invention relates to telecommunications equipment comprising a call-back memory suitable for storing telephone numbers of calling subscribers.

The invention likewise relates to a system and a telecommunications method for storing in a call-back memory of a terminal unit called unit which is subscribed to a telecommunications network, subscriber numbers termed calling subscribers who wish to be called back after an unsuccessful attempt at calling the equipment via the network.

BACKGROUND OF THE INVENTION

European patent application no. EP 0 746 130 A1 of German priority describes a mobile telephone comprising:

- a memory for storing telephone numbers corresponding to incoming calls that have failed,
- a selection device for permitting the user to select the numbers he wishes to call back and
- a sorting and comparing device for automatically classifying the selected numbers in a call-back list according to an order of priority determined by the call-back profile of the user of the mobile telephone.

The call-back list is thus constructed automatically as a function of objective criterions such as the call-back ratio calculated beforehand for each stored number, the number of call attempts originating from a same number, or also the value of a weight factor assigned by the user to his favorite numbers, these criterions defining the call-back profile of the user.

Such management of a call-back list raises the drawback of being based on statistical criterions while not taking into account the kind of the incoming calls and, more particularly, their urgent character which cannot be foreseen beforehand.

Moreover, as this call-back list contains all the numbers corresponding to incoming calls that have failed when it is full (the call-back list having of necessity a small size), certain subscriber numbers already stored are likely to be erased by the addition of new numbers.

On the other hand, the sorting and comparing operation is carried out after the user has selected numbers to be called back, there being a possibility that certain numbers have been lost even before they may have been selected and sorted. Indeed, if the telephone is the object of various call attempts from the side of the same subscriber, his number is stored in the memory as many times as the subscriber has made calls, which causes the risk of saturating the memory very rapidly.

SUMMARY OF THE INVENTION

It is thus an object of the invention to largely remedy these drawbacks by providing complete telecommunications equipment including means for managing call-back lists offering to the calling subscribers the possibility of giving a call-back priority character to their number, which is valid for the current call, notably as a function of the urgency of this call.

For this purpose, telecommunications equipment as mentioned in the opening paragraph is characterized in that it comprises a test and comparing means intended for identifying the calling subscribers and giving a call-back priority index to their respective subscriber numbers in order to store them in said memory with a probability of erasure relating to said index.

Similarly, a storing method as defined in the opening paragraph is characterized in that it comprises an identification step for calling subscribers for assigning a call-back priority index to their respective subscriber numbers and for storing said numbers in the call-back memory with a probability of erasure relating to said index.

According to an interesting characteristic of the invention, the identification of the calling subscribers is realized by providing a confidential identification code intended for giving their number an urgency character.

Thus, telecommunications equipment as defined above further comprising a means for synthesizing a digital code based on frequencies transmitted from a remote telephony device connected to said equipment is characterized in that said testing and comparing means receives said digital code on the input for comparing it with set codes and for producing a call-back priority index on the output.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
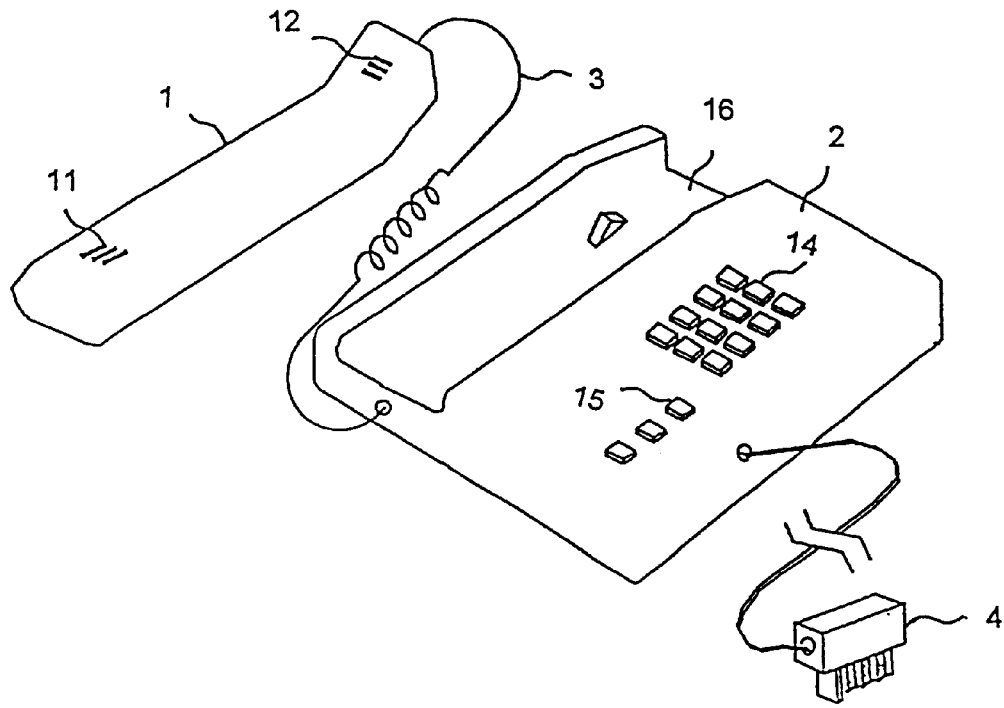
FIG. 1 represents an example of telephony equipment according to the invention.

The telephone represented in FIG. 1 comprises a handset 1 and a base station 2 connected by a cord 3, the whole being connected to a telephone line via a wire with a plug 4. The handset 1 has an earphone grid 11 and a microphone grid 12. The base station has dialling keys 14, function keys 15 and a handset cradle 16.

In a variant of an embodiment of the invention, the handset 1 may be linked to the base station 2 by radio. In that case, the handset 1 could carry keys 14 and 15, the whole thus forming a cordless telephone.

In another variant of an embodiment of the invention, the handset 1 could carry the keys 14 and 15 and could have a line and the plug 4 thus forming a complete monoblock type of telephone without the base station 2.

Figure 2:
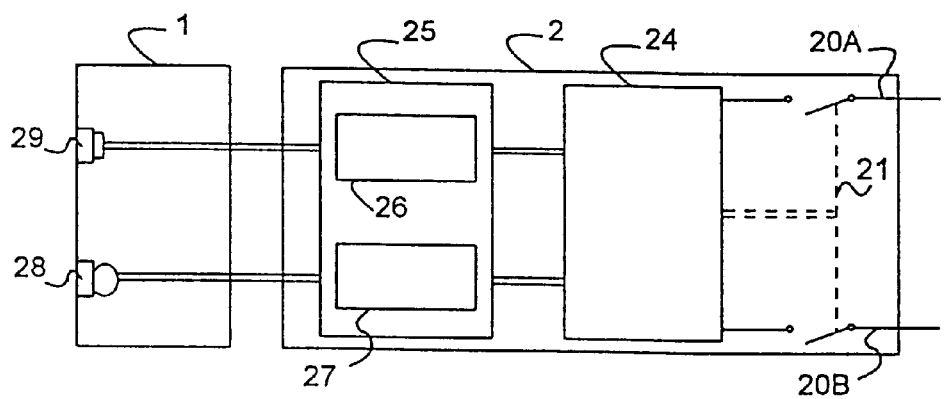
FIG. 2 is a simplified diagram of a telephone circuit suitable for embodying the invention.

In the simplified diagram of FIG. 2 which corresponds to that of the telephone in FIG. 1, the telephone line 20A, 20B comes in at the switch 21 called "cradle switch", then arrives at an integrated electronic circuit 24 of the DTMF type (Dual Tone MultiFrequency). In the receive mode, the DTMF synthesizes a digital code that corresponds to the frequency pairs transmitted by the telephone line and sent from the keyboard of a remote telephone. In the transmit mode the DTMF converts the digital code dialled with the keyboard of the local telephone into frequency pairs transmitted over the telephone line.

The test and comparing means represented by device 25 receives on the input the output signal of the circuit 24 and comprises storage means 26 for storing the identification codes of the subscribers having priority and includes a call-back memory 27 intended for storing the telephone numbers of the subscribers to be called back. According to the equipment shown in FIG. 1, these elements are located in the base station, indicated by a box 2, whereas the microphone 28 and the earphone 29 are located in the handset indicated by a box 1.

Figure 4:
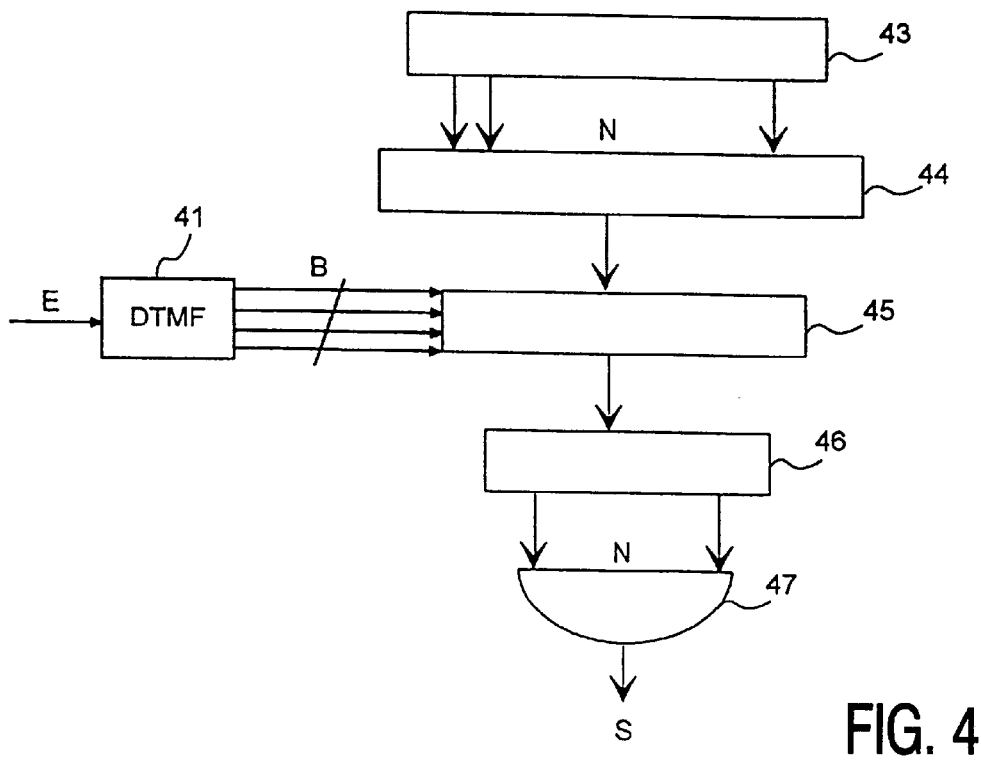
FIG. 4 represents a block diagram of a preferred embodiment of the subscriber identification device according to the invention.
Figure 5:
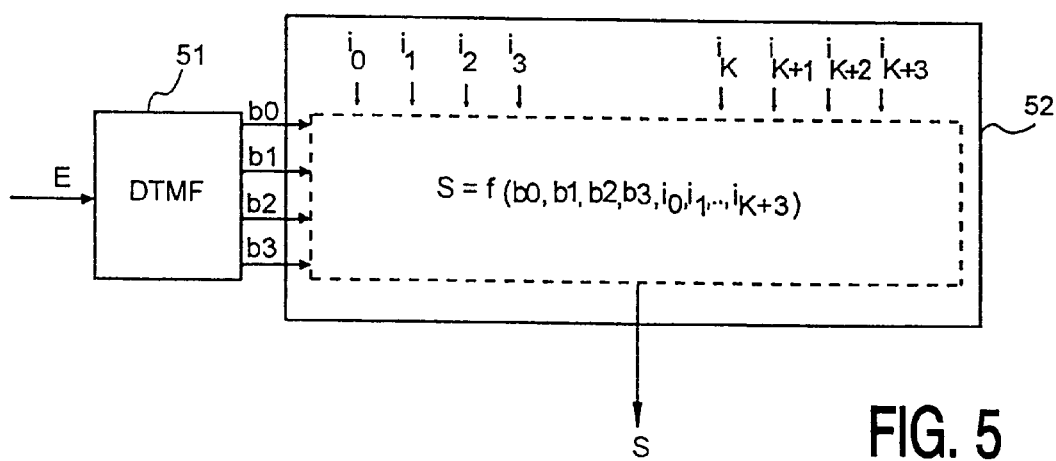
FIG. 5 represents a block diagram of another embodiment of the subscriber identification device according to the invention.

The operation of the call-back device according to the invention is based on the existence of a means for identifying the calling subscriber. To simplify matters, the FIGS. 3, 4 and 5 illustrate a realistic example where one wishes to distinguish only two types of subscribers: the subscribers having priority, having a code AC1 and a priority index P equal to 1 and the common subscribers not having a code and having a zero priority index.

Figure 3:
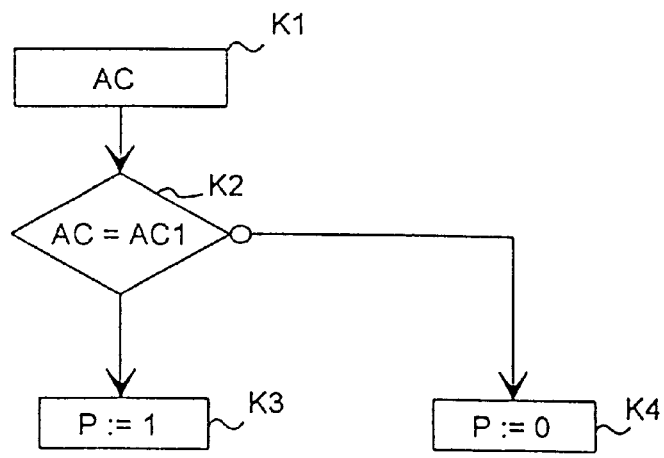
FIG. 3 is a flow chart illustrating the operation of the equipment according to the invention.

In FIG. 3, the sign = indicates that a test of equality between the two values situated on either one of the two sides of the = sign is made and the sign : = indicates that the value of the constant situated on the right is assigned to the variable situated on the left of the sign.

The method is illustrated by the following steps:

in box K1, the calling subscriber dialls his identification code AC with the keyboard of his telephone, in box K2, the test and comparing means 25 verifies whether the code AC received by the called party corresponds to a known subscriber whose code AC1 is stored in the memory 26; if the result of the test AC=AC1 is positive, the identification method proceeds with box K3, if not, box K4 is proceeded to directly, in box K3, the number of the code AC corresponds to the type of subscriber having priority (the result of the test AC=AC1 is positive), his telephone number is thus stored in the call-back memory 27, having a priority index equal to 1 (P:=1), in box K4, the code AC being faulty (the result of the test AC=AC1 is negative), the telephone number of the calling subscriber is stored in the call-back memory 27 with a zero priority index (P:=0).

In a preferred embodiment of the invention, the telephone numbers of the subscribers to be called back are stored in separate lists of the memory 27 as a function of their type of subscription. When a list is full and a new number is to be stored in this list, an old number of the list is automatically erased and replaced by the new number because these lists are small (the size of the memories being fixed). The principle of the separate lists permits of avoiding that a list is saturated too rapidly and important numbers are erased.

To benefit the most from this embodiment, a configuration is preferred in which the lists are of the same size and the number of subscribers of each type decreases when the associated priority index increases. For a perfect security, the number of subscribers of the type whose priority index is the highest is to be smaller than the maximum capacity of the list dedicated to them.

In a variant of an embodiment of the invention all the numbers to be called back are stored in the same list, but under a code indicating their priority index. When the memory is full, the numbers are erased in the order of the rising priority indices.

The FIGS. 4 and 5 represent two embodiments of the test and comparing means 25 used in telephone equipment according to the invention, comprising a circuit of the DTMF type receiving analog frequency signals on the input E transmitted by the calling unit via an analog telephone line.

The particularly cost-effective preferred embodiment of the subscriber identification device, represented in FIG. 4, associates a circuit 41 of the DTMF type present in the greater part of the currently used keyphones to very inexpensive electronic components, among which:

a first shift register 43 for storing the identification code AC1 of the subscribers having priority; AC1 is coded in N decimal figures corresponding to the N numbers of keys activated by the calling party for dialling his identification code, each number of a key being coded in B bits (in the Figure B=4), a selection circuit 44 for selecting the N figures of the AC1 code one by one, a comparing circuit 45 for comparing in the order of arrival, the figure of the selected AC1 code with that of the AC code (also in B bits) dialled as appropriate by the calling subscriber and synthesized by the DTMF circuit 41 on the basis of frequencies transmitted from the keyboard of the telephone station of the calling party and transmitted over the telephone line, a second shift register 46 for storing the result in N bits of the N comparisons made, an AND gate 47 receiving on the input the N bits of the previous result and producing on the output S a binary signal serving as an input selector for the memory component 27; one arbitrarily chooses that the signal S=1 (the produced code AC is correct) activates the memory 27 in the write mode for storing the telephone number of the calling subscriber and that the signal S=0 (the code is incorrect) deactivates the memory In another embodiment of the invention represented in FIG. 5, the previous circuit, with the exception of DTMF 41, may be replaced by a programmable logical integrated device 52 of the PLD type (programmable logical device), receiving on the input the four bits b0, b1, b2 and b3 of the code AC produced by the DTMF 51.

The value of the output signal S serving as a selector for the memory component 27 is given by the formula:

$$\prod_{m=0}^{m=N-1} (b0 \oplus i_{4m})(b1 \oplus i_{4m+1})(b2 \oplus i_{4m+2})(b3 \oplus i_{4m+3})$$

where the sign $\oplus$ represents a logic EXCLUSIVE OR and where the variables $i_o$ to $i_k$ represent the bits of the quadruplets forming the figures of the code AC1 stored in a memory 26. When supposing that AC1 has N figures, k=(4*N)−1.

Figure 6:
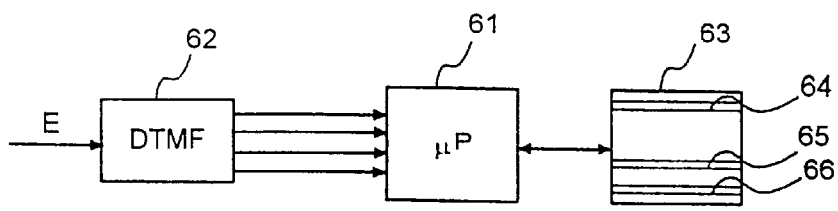
FIG. 6 represents a circuit of another embodiment of telephony equipment according to the invention.

FIG. 6 represents a circuit of a high-range telephone according to another embodiment of the invention. It comprises a microprocessor assembly 61, a DTMF circuit 62 and a memory 63 of the reprogrammable ROM (Read-Only Memory) or EEPROM type (Electrically Erasable Programmable ROM) containing at least a table 64 for storing the codes AC which give right to a call-back priority.

The data coming from the output of the circuit DTMF are stored in a table 65 of the memory 63 whose position index is incremented depending on the arrival of the data. The contents of the table 65 are then compared with various access codes of the list 64 via a loop of the position index of the table. If the code AC produced by the DTMF 62 is correct, the telephone number of the calling party is stored in another table 66 of the memory 63 as a function of its priority index, depending on a method selected from those described previously with respect to FIG. 3.

Certain telephony devices additionally include a responder/recorder device, capable of transmitting and receiving voice messages and recognizing a secret code dialled from the keyboard of a remote station for effecting from a distance operations such as listening to recorded messages, modifying the announcement of the responder or the secret code.

According to a variant of an embodiment of the invention, a responder/recorder device could be used here for delivering a message to the calling person and invite him to enter his identification code and, if possible, his telephone number to be called back if the telephony device does not already include an automatic recording function for recording incoming calls that have failed.

Figure 7A:
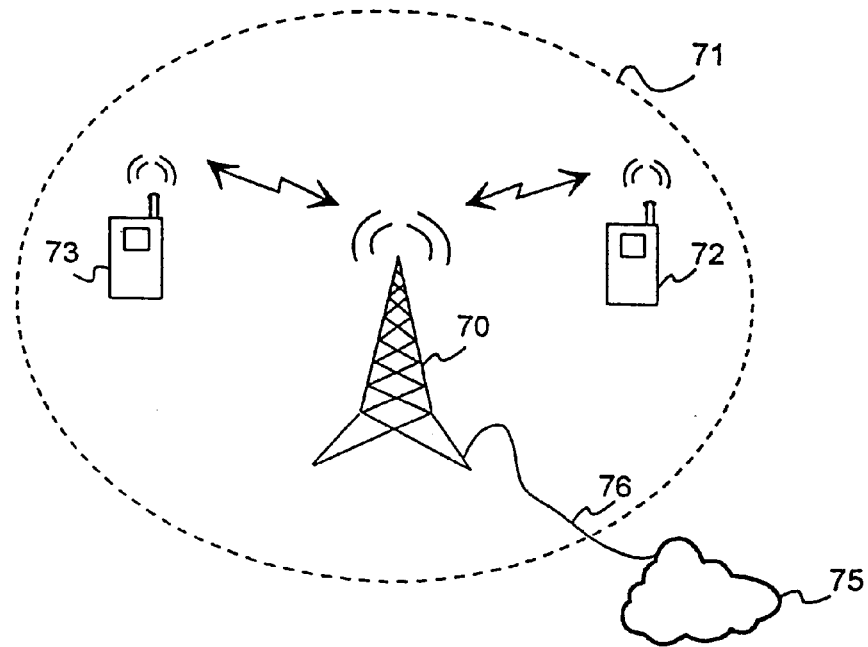
FIG. 7 represents a telecommunications system according to the invention applied to mobile telephony.
Figure 7B:
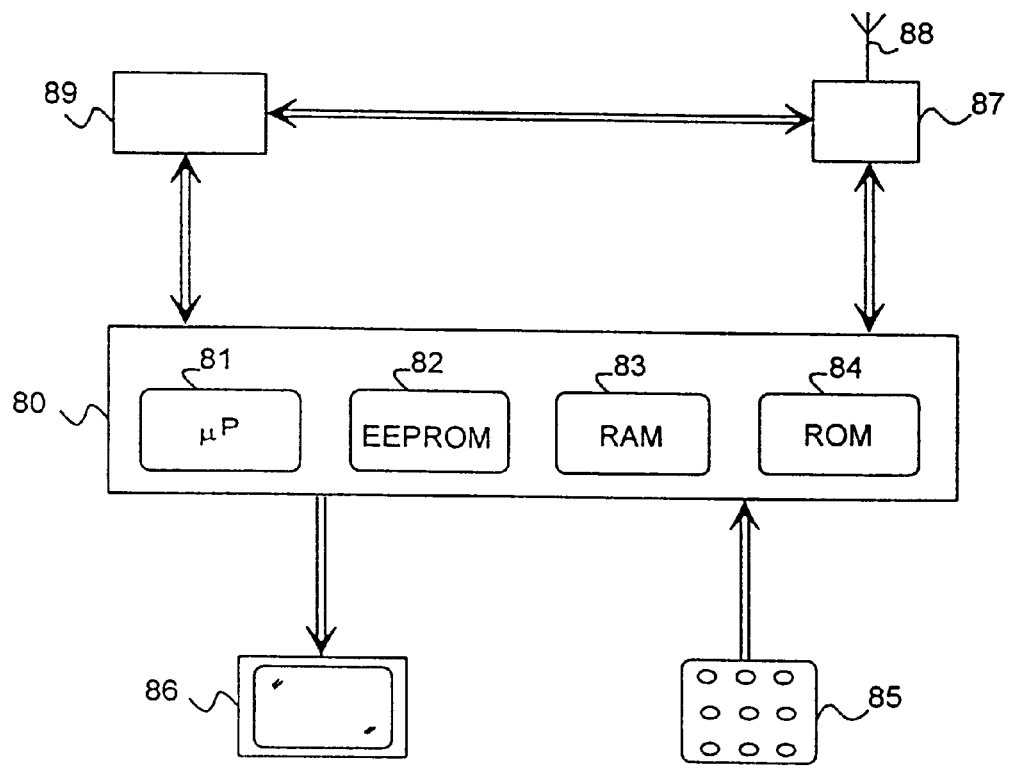

FIG. 7 describes a telecommunications system according to the invention, notably applied to mobile telephony. The embodiment which will be described is particularly suitable for an analog cellular system of the AMPS type (Advanced Mobile Phone Service) or ETACS (Extended Total Access Communications System).

The system represented in A comprises a radio base station 70 which has a coverage area 71 inside which two terminals 72 and 73 may move while being in radio connection with the radio base station 70. The latter is connected to the public switched telephone network 75 by a cable 76.

A circuit shared by the telephone terminal units 72 and 73 is represented in B in FIG. 7. The control element 80 comprises:

- a data processor 81,
- an electrically erasable programmable read-only memory 82 EEPROM in which notably the telephone numbers of the subscribers to be called back and the identification codes are stored,
- a random-access memory 83 RAM and
- a read-only memory 84 ROM for storing the main operation program of the device.

The control element 80 also receives signals from the keyboard 85 and manages the display 86 of the telephone. It finally controls a transceiver circuit 87 coupled to an antenna 88 for exchanging the radio signals (simplified in A by lightning arrows) with the radio base station 70. The signals are processed by a synthesizer 89 of which one output is directly connected to the data processor 81 which transforms them into data frames according to a protocol defined by the standard used (here the AMPS/ETACS standard).

Two logic solutions may be implemented for embodying the invention, depending on whether one wishes not to modify the protocol used for communication with the radio base station 70 or one wishes to create a specific frame which, in order to be used, will have to be made the object of a standardization.

The solution according to the invention consists of utilizing an existing frame which comprises a free data field for transmitting the data relating to the call back of the subscribers according to the invention. Numerous communication protocols and notably the ETACS protocol comprise a frame of the CLI type (Calling Line Identification) containing, inter alia, the telephone number of the calling party, and frames called "user frames" not reserved by the standard, which permit to transmit whatever type of data. These "user frames" may be used for conveying, for example, the priority code of the subscriber 72 who desires to be called back by the subscriber 73. The telephone number of the subscriber 72, transmitted to the called party 73 in a frame of the CLI type, will be processed locally by the data processor 81 of the called subscriber 73 and recorded in the call-back memory 82 depending on its priority index provided in a frame of the "user frame" type.

If the communication protocol used by the mobile units 72 and 73 does not contain a frame of the CLI type, the telephone number of the subscriber 72 may be transmitted manually in a frame of the "user frame" type. In that case, the subscriber 72 has to dial himself his telephone number with the aid of his keyboard, for example, at the end of his private code in a same "user frame".

The processing of the data relating to the call back of subscribers is thus completely transparent for the radio base station 70 of the network.

Thus, telecommunications equipment, a method and a system have been described with the aid of examples for producing effective management means for call-back lists of subscribers to a telecommunications network.

Obviously, the invention is not restricted to the embodiments described, variants will be apparent to the man or woman of ordinary skill in the art without leaving the scope of the invention.

What is claimed is:

1. Telecommunications equipment comprising a call-back memory suitable for storing telephone numbers of calling subscribers, characterized in that it comprises a test and comparing means intended for identifying the calling subscribers and giving a call-back priority index to their respective subscriber numbers in order to store them in said memory with a probability of erasure relating to said index.

2. The telecommunications equipment as claimed in claim 1, further comprising a means for synthesizing a digital code from frequencies transmitted by a remote telephony device connected to said equipment, characterized in that said test and comparing means receives said digital code on the input for comparing it with set codes and for producing a call-back priority index on the output.

3. Telecommunications equipment as claimed in claim 1, characterized in that said numbers of calling subscribers stored in said call-back memory are arranged in distinctive lists as a function of said call-back priority index.

4. Telecommunications equipment as claimed in claim 1, characterized in that, when said call-back memory is full, new numbers of calling subscribers are stored in said memory by erasing old numbers in an order that depends on their call-back priority index.

5. Telecommunications equipment as claimed in claim 1, characterized in that it comprises in addition an automatic number dialing device which cooperates with the call-back memory for automatically calling back the numbers stored in said call-back memory.

6. Telecommunications equipment as claimed in claim 1, belonging to a mobile telephone network utilizing a communication protocol which comprises free frames called "user frames", characterized in that at least one of an identification code of the calling subscriber and his subscriber number is transmitted to the equipment in said "user frames".

7. The telecommunications equipment as claimed in claim 6, the communication protocol comprising a frame of the CLI type (Calling Line Identification) defined in the ETACS standard (Extended Total Access Communication System) containing the number of the calling subscriber, characterized in that this calling subscriber's number is copied in the call-back memory based on the number contained in the frame of the CLI type.

8. A telecommunications system, characterized in that it comprises a plurality of terminal units as claimed in claim 1, suitable for communication between them via a telephone network.

9. A telecommunications method for storing in a call-back memory of a terminal unit termed called unit subscribed to a telecommunications network, subscriber numbers called calling subscribers who wish to be called back after an unsuccessful attempt at a call to equipment via said network, characterized in that it comprises an identification step of the calling subscribers for assigning a call-back priority index to their respective subscriber numbers and for storing said numbers in the call-back memory with a probability that said numbers will be deleted in dependence on their priority index.

10. The telecommunications method as claimed in claim 9, characterized in that said identification step of the subscribers comprises:

at the level of the calling party:
        applying an identification code to the called party,
    at the level of the called party:
        comparing said produced code with set codes and as a function of a result of the comparison,
        assigning a call-back priority index to said subscriber number.

\* \* \* \* \*